Patented Nov. 8, 1949

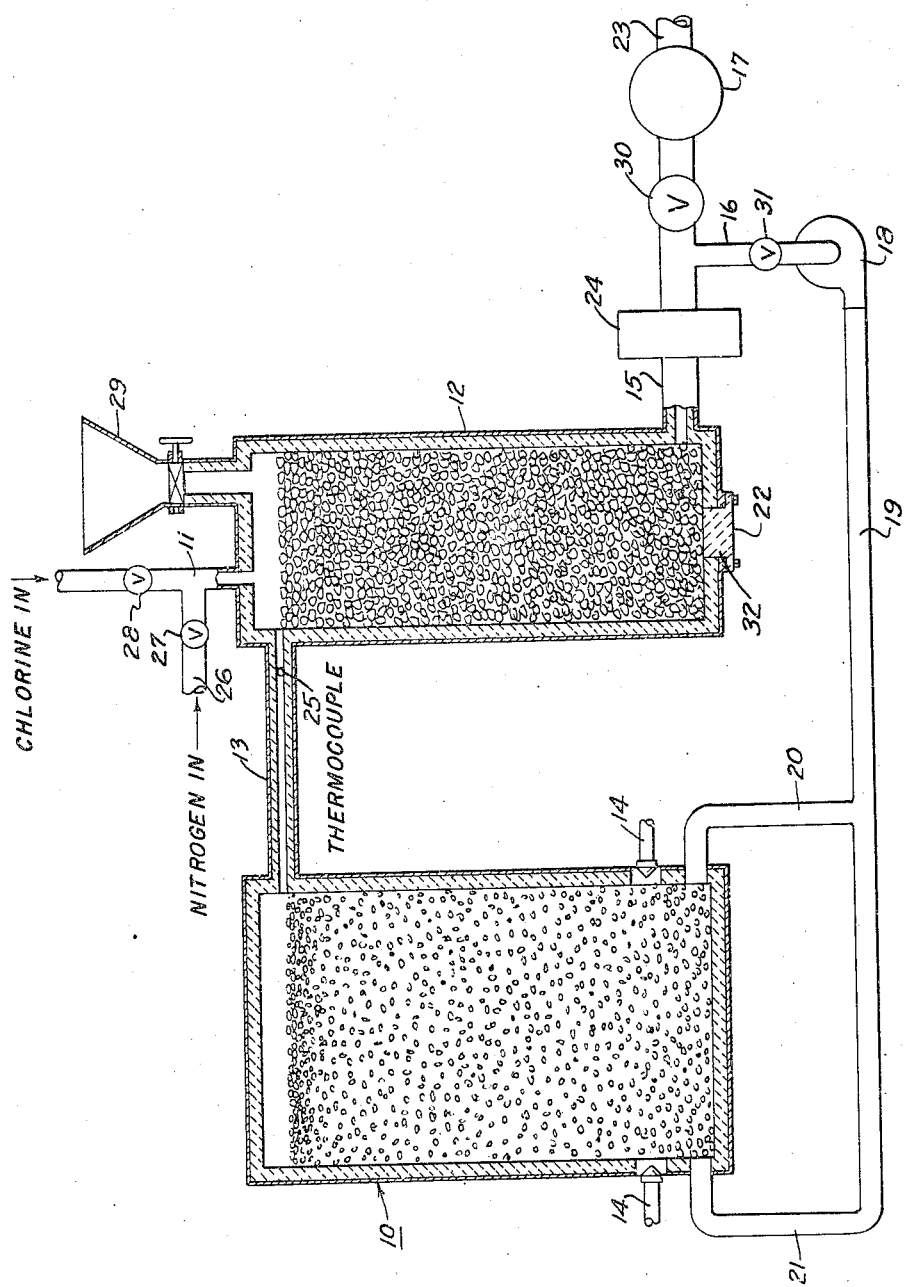

2,487,497

UNITED STATES PATENT OFFICE 2,487,497

PROCESS OF PURIFYING MAGNESIA

Arthur W. Vettel, Watsonville, Calif., assignor to The Permanente Metals Corporation, Oakland, Calif., a corporation of Delaware Application May 8, 1948, Serial No. 25,839

10 Claims. (Cl. 23—201)

This case relates to the purification of magnesia, and particularly to the removal of iron, manganese, boron and calcium from magnesia containing such impurities.

Magnesia derived from bitterns, brines or seawater, or from natural deposits such as brucite, magnesite or dolomite, contains small amounts of iron, calcium, manganese and boron. The amount or proportion of each of these substances varies with the source of the magnesia and the method of treating the starting material to extract the magnesia therefrom. In the case of liquid sources of magnesia such as brines, seawater and the like, the liquid is usually treated with calcined limestone or dolomite, or with lime, either dry or in the form of a slurry of the treating agent in water. The impurities hereinabove referred to may be derived from the treating agent or the seawater or bittern. For instance, boron usually derives from seawater or bittern, and iron and manganese largely derive from limestone or dolomite, while calcium occurs both in the starting liquid and in the treating agent. Impurities of this type are likewise present in magnesia derived from the natural ores mentioned above.

When magnesia or magnesium hydroxide is to be used for some purposes, particularly as a pharmaceutical or for high temperature electrical insulation, such impurities must be removed. It is known for instances, that the presence of boron or its compounds is objectional in materials intended for human consumption. It is also well recognized that the presence of iron in magnesia refractories or ceramics increases their conductivity of both electricity and heat. The presence of iron and boron is highly undesirable in high temperature electrical insulation as either decreases the resistivity coefficient remarkably, even in amounts of as low as 0.15% It has previously been proposed to remove iron and manganese from magnesia by dissolving the impure material in an acid, carefully precipitating the iron and manganese from the resulting solution as the hydroxides, and then recovering the magnesia. The reprecipitation purification of magnesia has the disadvantage of being slow and expensive, and it has the further feature, undesirable in some cases, that the magnesia so obtained has a low bulk density, for instance of around 35 pounds per cubic foot.

It is an object of the present invention to remove impurities, as described, from magnesia containing them in small or residual amounts. It is a further object to remove such impurities in a rapid manner and without substantially decreasing the bulk density of the magnesia. Other objects will be apparent from the description below.

According to the present invention it has been found that impurities which form volatile chlorides, particularly boron, iron, manganese and calcium, are removed from magnesia containing them by chlorination at an elevated temperature in a reducing atmosphere. The impurities defined are probably present as the oxides, and in this process the oxygen thereof reacts with the reducing agent, and the undesired element then forms the chloride, which is volatilized.

The magnesia treated according to this invention can be obtained by calcining the precipitate recovered by treating seawater, brines or other magnesium salt-containing solutions with lime, calcined dolomite or alkali hydroxide in dry, slurry or solution form. The method of purification is also applicable to magnesia obtained by calcining magnesium carbonate precipitated in known manner from seawater, brines or other magnesium-salt containing solutions; and it is also applicable to magnesia obtained by calcining natural ores, such as magnesite and brucite.

The reducing atmosphere can be supplied by a random dispersion of solid carbonaceous reducing agent, such as coke, coal or the like, in the magnesia charge but in minor proportion with respect to the magnesia, and not necessarily in intimate admixture therewith. In fact, it is preferred that the magnesia and reducing agent be not in intimate admixture to avoid any tendency to reduction of the magnesia.

The magnesia is treated, without substantial conversion thereof to the chloride, with a chlorine-yielding gas such as chlorine, hydrogen chloride, sulfur chloride or a chlorinated hydrocarbon gaseous under the conditions of operation, for example, carbon tetrachloride, a chloroethane or the like, or mixtures of two or more of these chlorine-yielding gases. The chlorinated hydrocarbons are particularly useful because they yield chlorine and also a hydrocarbon material which aids in maintaining a reducing atmosphere.

Advantageously magnesia which has been so calcined that it exhibits sufficient activity that it hydrates with added water moderately rapidly is formed into agglomerates, such as pellets, nodules, or the like, with a small amount of water. The preparation of such agglomerates is described and claimed in the co-pending application of Woodward, Serial No. 557,047. These agglomerates contain principally magnesium hydroxide and are therefore calcined under the conditions of chlorination, as will be made more clear by the further description below, to yield a magnesia agglomerate. Preferably the water used in the agglomerating operation contains some dissolved sodium chloride and, if desired, magnesium chloride. Seawater is quite suitable for this purpose. Upon heating the agglomerate to about 1000° C. to 1200° C., these chlorides are driven off, along with water of hydration, producing a magnesia pellet of such porosity as will enable more complete and rapid penetration of the chlorine-yielding gas in the chlorinating step.

The agglomerates prepared as described are strong and suitable for charging into a furnace or stack kiln. This strength apparently derives for the most part from the bonding effect set up by the hydration of the MgO to magnesium hydroxide, but when magnesium chloride solution is added some magnesium oxychloride bond is probably also formed.

Alternatively, magnesia in more finely divided form can also be chlorinated to remove the impurities described but without substantial conversion of magnesium oxide to magnesium chloride. For ease of operation and recovery of the purified magnesia, however, treatment in the agglomerated form, or of larger pieces otherwise obtained, is preferred. For instance, brucite or magnesite is preferably crushed to pieces of about one-half to one inch size, and calcined, prior to the chlorination treatment.

As stated above, chlorination is carried out in a reducing atmosphere. Such a reducing atmosphere is advantageously maintained by the presence of a gaseous reducing agent such as hydrocarbon gas, gases generated by the combustion of carbonaceous or hydrocarbon fuels, or other suitable reducing gas. The gaseous mixture resulting from the combustion of a fuel gas, butane, propane or the like, and containing a minor proportion of carbon monoxide and as a major component a mixture of nitrogen, carbon dioxide and water vapor, provides a preferred reducing atmosphere. Alternatively, reducing conditions can be effected by addition to the charge of a minor proportion of solid carbonaceous material in random dispersion. Sometimes it is also advantageous to introduce a small amount of an inert sweeper gas, such as nitrogen or helium, to sweep any iron parts to be exposed to chlorine or to enable complete removal of volatile chlorides formed.

The chlorination treatment may be carried out in any suitable container or vessel, for instance in a pot furnace or a stack kiln, preferably lined with magnesia refractory, and operation may be batch or continuous. Heating can be effected internally or externally. After the furnace is brought to the desired temperature, heating can be discontinued during the chlorination period.

Chlorination is carried out at temperatures at which the vapor pressures of the chlorides of the impurities are effective to permit their removal in the gas stream. Advantageously the chlorination is carried out at a temperature of from about 1050° C. to about 1400° C. Although the boiling point of calcium chloride is shown in the literature to lie above 1600° C., it is observed that considerable reduction in calcium content is effected by operating the process of this invention at the temperatures set forth above. The optimum temperature of operation for volatilization and removal of iron and manganese chlorides is about 1100° C., and the optimum temperature for removal of boron and calcium is a little higher, that is, from 1200° C. to 1400° C., but within the range cited all of these impurities are reduced as shown.

If desired, the effluent gases from the chlorination zone can be treated to recover the volatilized chlorides. It is known that magnesia also tends to react with chlorine-yielding gas, in the presence of a reducing agent, to form magnesium chloride. According to the present process, however, it has been found that the content of the described impurities can be markedly decreased by working under the conditions described without effecting substantial conversion of magnesia to magnesium chloride. Magnesium chloride formed in the operation is converted again to magnesia by firing the treated product under oxidizing conditions.

The figure is a schematic diagram of a form of apparatus for carrying out the chlorination process.

This apparatus comprises two containers, 10 and 12, joined by conduit 13. Chamber 10 is the heat-supplying element of the structure and comprises an outer shell of steel or other suitable material protectively lined, preferably with magnesia refractory. It is charged with a gas-traversable heat-absorbent refractory, preferably periclase, in the form of lumps, nodules, pellets or the like. Heat is supplied to the chamber by means of burners 14 entering the chamber at the lower part of the furnace walls. Conduit 13, also suitably of steel and having a protective lining, serves to conduct the hot gases of combustion from chamber 10 to, in this embodiment, the upper portion of chlorination chamber 12.

Chlorination chamber 12 comprises a shell of metal or other suitable material protectively lined, preferably with silica brick. A conduit or pipe 11 of ceramic material or of metal having a ceramic, such as silica, lining, debouches into the top of chamber 12 and serves to lead chlorine or chlorine-yielding gas thereinto. Pipe 26 communicates with pipe 11 and supplies therethrough a current of nitrogen to chamber 12 at the beginning of the run, sweeping away any oxygen which may be present in the pipe. Flow of nitrogen and of chlorine gas are controlled by suitable valves 27 and 28, disposed in the respective pipes. Magnesia to be treated is charged to chamber 12 from hopper 29 disposed above the chamber and communicating with the top thereof. Aperture 32 in the base of chamber 12 is provided with removable cover 22, and the treated magnesia is withdrawn through 32.

Exhaust gases from the chlorination treatment and also gases of combustion which heat the magnesia charge to the desired temperature, as well as nitrogen gas, are drawn off from chamber 12 through conduit 15. These gases preferably pass through a water scrubber 24, to remove volatilized chlorides, and then are either exhausted, as to the atmosphere, by way of pipe 23 and fan 17, or are recycled by fan 18 and pipes 16, 19, 20 and 21. Flow of gases to the atmosphere or to the recycling system is controlled by suitable valves 30 and 31. The apparatus is preferably sealed against leakage of gas.

As an example of the method of carrying out this invention, magnesia containing impurities including iron, manganese, boron and lime is treated in the apparatus above described. 140 lbs. of magnesia pellets, as described above, are charged into chamber 12, and burners 14 are started, the fuel being butane, and furnace 10 being filled with nodules of periclase. Valve 30 is open during the heating stage. The hot gases heat the periclase and also the magnesia to be treated. A thermocouple 25 disposed in conduit 13, quite close to the chlorinating chamber, is employed to measure the temperature of the gases.

When this temperature reaches about 1100° C.–1200° C., the burners are shut off, nitrogen is introduced through pipe 11 to wash air out of the apparatus, then the nitrogen flow is discontinued and flow of chlorine gas is begun. As this flow begins and the burners are shut off, valve 30 is closed and valve 31 is opened so that the mixture of chlorine and gases of combustion is recycled. This is continued for about 20 minutes. From time to time during the chlorinaiton operation a little butane is preferably admitted through the burners to maintain the slightly reducing atmosphere. In an alternative operation, to obtain optimum conditions for the various impurities, the temperature can be held at about 1100° C. for part of the run to remove mostly iron and manganese and then increased to about 1200° C. to remove mostly boron and calcium.

At the end of the chlorination period, the flow of chlorine is stopped, valve 31 is closed and valve 30 opened, the burners are started and the treated magnesia pellets are calcined (under oxidizing conditions). This firing step requires from about an hour to one and three-quarter hours, and the temperature may go as high as about 1400° C. At the end of the final calcination step the burners are shut off and the magnesia is withdrawn through aperture 32 in the base of chamber 12. In this example, about 6 lbs. of chlorine are added. In practice, from about 4 to about 10 lbs. of chlorine per 100 lbs. of magnesia are employed to reduce the impurities as described; and usually about 5 lbs. of chlorine per 100 lbs. of magnesia reduce the impurities content as described and yield magnesia of excellent characteristics.

The magnesia treated in this example is material obtained by treating seawater with dry calcined dolomite to precipitate magnesium hydroxide, washing the magnesium hydroxide, filtering the washed hydroxide sludge, calcining the filter cake, adding a small amount of seawater to the calcine, and forming into pellets of about half-inch length and about quarter inch diameter. The formed pellets are allowed to stand to hydrate and harden.

This magnesia starting material for the chlorination process in the above example contains the following impurities, as shown, on the ignited basis: $Fe_2O_3$, 0.25%; $B_2O_3$, 0.22%; $CaO$, 1.30%; $MnO$, 0.05%. After chlorination, on the ignited basis, the impurities are as follows: $Fe_2O_3$, 0.04%; $B_2O_3$, 0.10%; $CaO$, 0.95%; $MnO$, 0.005%.

The product obtained by this process is excellent for making electrical insulators for high temperature installations because of its low iron and boron content, especially; furthermore, because of its high bulk density (110 lbs. per cu. ft. or higher) and low dust loss due to its nodule form, as well as its high thermal conductivity, it is very suitable for processing into such products by fusion in an electric furnace.

All analyses of magnesia shown herein are expressed as percent by weight. The term magnesia, as applied to the starting material, in this specification and in the appended claims is intended to include magnesium oxide and magnesium hydroxide, inasmuch as magnesium hydroxide is calcined to the oxide at the temperatures employed. The treated magnesia can be hydrated again to give the hydroxide, if desired.

I claim:
1. Process of purifying magnesia which includes flowing a stream of hot gases of combustion through a bed of heat-absorbent refractory, then flowing said gases through a bed of said magnesia to heat said magnesia, flowing a chlorine-yielding gas through said heated magnesia in admixture with said stream of gases of combustion, withdrawing the gas mixtures, washing said gas mixture to remove volatilized impurities, flowing said gas mixture through said bed of heat-absorbent refractory and then flowing said gas mixture through said magnesia.

2. Process as in claim 1 wherein the chlorine-yielding gas is chlorine.

3. Process of purifying magnesia containing impurities including iron, boron, manganese and calcium which includes passing a stream of hot gases of combustion through a bed of heat-absorbent refractory, then flowing said gases through a bed of said magnesia to increase the temperature of said magnesia bed to from about 1050° C. to about 1400° C., flowing a chlorine-yielding gas through said heated magnesia in admixture with said stream of combustion gases, withdrawing the gas mixture, washing said gas mixture to remove volatilized impurities including iron, boron, maganese and calcium, flowing said gas mixture through said bed of heat-absorbent refractory and then flowing said gas mixture through said magnesia.

4. Process as in claim 3 wherein the chlorine-yielding gas is chlorine.

5. Process of purifying magnesia containing impurities including iron, boron, manganese and calcium which comprises passing a stream of hot gases of combustion through a bed of periclase refractory nodules, then flowing said gases through a bed of said magnesia to heat said magnesia to from about 1050° C. to about 1400° C., flowing chlorine gas through said heated magnesia in admixture with said gas stream, withdrawing the gas mixture, washing said gas mixture to remove volatilized impurities including chlorides of iron, boron, calcium and manganese, flowing said washed gas mixture through said periclase and then flowing said gas mixture through said magnesia, while maintaining a reducing atmosphere by intermittent introduction of hydrocarbon gas to the flowing gas mixture.

6. Process as in claim 5 wherein the magnesia to be purified is prepared by treating seawater with dry calcined dolomite, washing the magnesium hydroxide precipitate, filtering to recover said hydroxide, calcining said hydroxide to medium burn magnesia and forming said magnesia into agglomerates with the addition of a minor proportion of water.

7. Process as in claim 5 wherein the chlorine is added in the proportion of from about 4 to about 10 pounds per 100 pounds of magnesia.

8. Process of purifying magnesia containing impurities including iron, boron, manganese and calcium which includes passing a stream of hot gases of combustion through a bed of periclase refractory nodules, then flowing said gases through a bed of said magnesia to heat said magnesia to from about 1100° C. to about 1200° C., flowing chlorine gas through said heated magnesia in admixture with said gas stream, withdrawing the gas mixture, washing said gas mixture with water to remove volatilized impurities including chlorides of iron, boron, manganese and calcium, flowing said washed gas mixture through said periclase and then flowing said gas mixtures through said magnesia, while maintaining a reducing atmosphere by intermittent introduction of hydrocarbon gas to the flowing gas mixture.

9. Process as in claim 8 wherein the magnesia to be purified is prepared by treating seawater with dry calcined dolomite, washing the magnesium hydroxide precipitate, filtering to recover said hydroxide, calcining said hydroxide to medium burn magnesia, and forming said magnesia into agglomerates with the addition of a minor proportion of an aqueous solution of a substance chosen from the group sodium chloride and magnesium chloride.

10. Process as in claim 8 wherein the chlorine is added in the proportion of about 5 pounds per 100 pounds of magnesia.

ARTHUR W. VETTEL.

No references cited.